United States Patent
Duan

(10) Patent No.: US 9,255,831 B2
(45) Date of Patent: Feb. 9, 2016

(54) APPARATUS AND METHOD FOR IMPROVING THE ACCURACY OF MEASUREMENTS TAKEN WITH A CAPACITANCE-TYPE SENSOR

(75) Inventor: Justin Duan, Burnaby (CA)

(73) Assignee: WESTPORT POWER INC., Vancouver (CA)

( * ) Notice: Subject to any disclaimer, the term of this patent is extended or adjusted under 35 U.S.C. 154(b) by 1262 days.

(21) Appl. No.: 12/906,995

(22) Filed: Oct. 18, 2010

(65) Prior Publication Data

US 2011/0071777 A1 Mar. 24, 2011

Related U.S. Application Data

(63) Continuation of application No. PCT/CA2009/000562, filed on Apr. 27, 2009.

(30) Foreign Application Priority Data

Apr. 28, 2008 (CA) ...................................... 2629960

(51) Int. Cl.
*G01F 17/00* (2006.01)
*G01F 25/00* (2006.01)
*G01D 3/02* (2006.01)
(Continued)

(52) U.S. Cl.
CPC .............. *G01F 25/0076* (2013.01); *G01D 3/02* (2013.01); *G01D 5/24* (2013.01); *G01F 23/266* (2013.01)

(58) Field of Classification Search
CPC ...... G01F 23/263; G01F 25/0076; G01D 3/02
USPC ....................................................... 702/55, 52
See application file for complete search history.

(56) References Cited

U.S. PATENT DOCUMENTS

| 3,721,121 A | 3/1973 | Fierfort |
| 4,090,408 A * | 5/1978 | Hedrick ...................... 73/304 C |
| 4,417,472 A | 11/1983 | Tward |

(Continued)

FOREIGN PATENT DOCUMENTS

WO  WO 2008064010 A2 *  5/2008

OTHER PUBLICATIONS

Canadian Centre for Occupational Health and Safety, Cryogenic Liquids—Hazards, http://www.ccohs.ca/oshanswers/chemicals/cryogenic/cryogen1.htm.?print, (Nov. 27, 1997).*

(Continued)

*Primary Examiner* — Mischita Henson
*Assistant Examiner* — Stephanie Bloss

(57) ABSTRACT

An apparatus and method improve the accuracy of measurements taken with a capacitance-type sensor. In addition to the sensor the apparatus comprises a measurement circuit and a microprocessor. One of the sensor or a calibration capacitor with a known and fixed capacitance is connectable to the measurement circuit by a switch that has its position controlled by the microprocessor. The microprocessor sends measurement signals to the measurement circuit and receives data therefrom. According to the disclosed method, the measurement circuit is programmed to determine an error between measured calibration data and the known capacitance and to use this error to calculate a correction value, which it applies to the measured sensor data to calculate corrected sensor measurements.

8 Claims, 5 Drawing Sheets

(51) Int. Cl.
*G01D 5/24* (2006.01)
*G01F 23/26* (2006.01)

(56) References Cited

U.S. PATENT DOCUMENTS

| | | | |
|---|---|---|---|
| 4,417,473 A | | 11/1983 | Tward et al. |
| 4,590,575 A | * | 5/1986 | Emplit .................... 702/52 |
| 4,676,100 A | | 6/1987 | Eichberger |
| 4,716,536 A | * | 12/1987 | Blanchard .................... 702/100 |
| 4,723,122 A | * | 2/1988 | Maltby et al. ............ 340/870.38 |
| 6,016,697 A | | 1/2000 | McCulloch et al. |
| 6,977,646 B1 | | 12/2005 | Hauck et al. |
| 2009/0120159 A1 | * | 5/2009 | Barlesi et al. .................. 73/1.73 |

OTHER PUBLICATIONS

International Search Report and Written Opinion of the International Searching Authority issued on Sep. 16, 2009, in connection with International Application No. PCT/CA2009/000562.

Office Action issued by the Canadian Intellectual Property Office on Aug. 12, 2008 in connection with Canadian Patent Application No. 2,629,960.

* cited by examiner

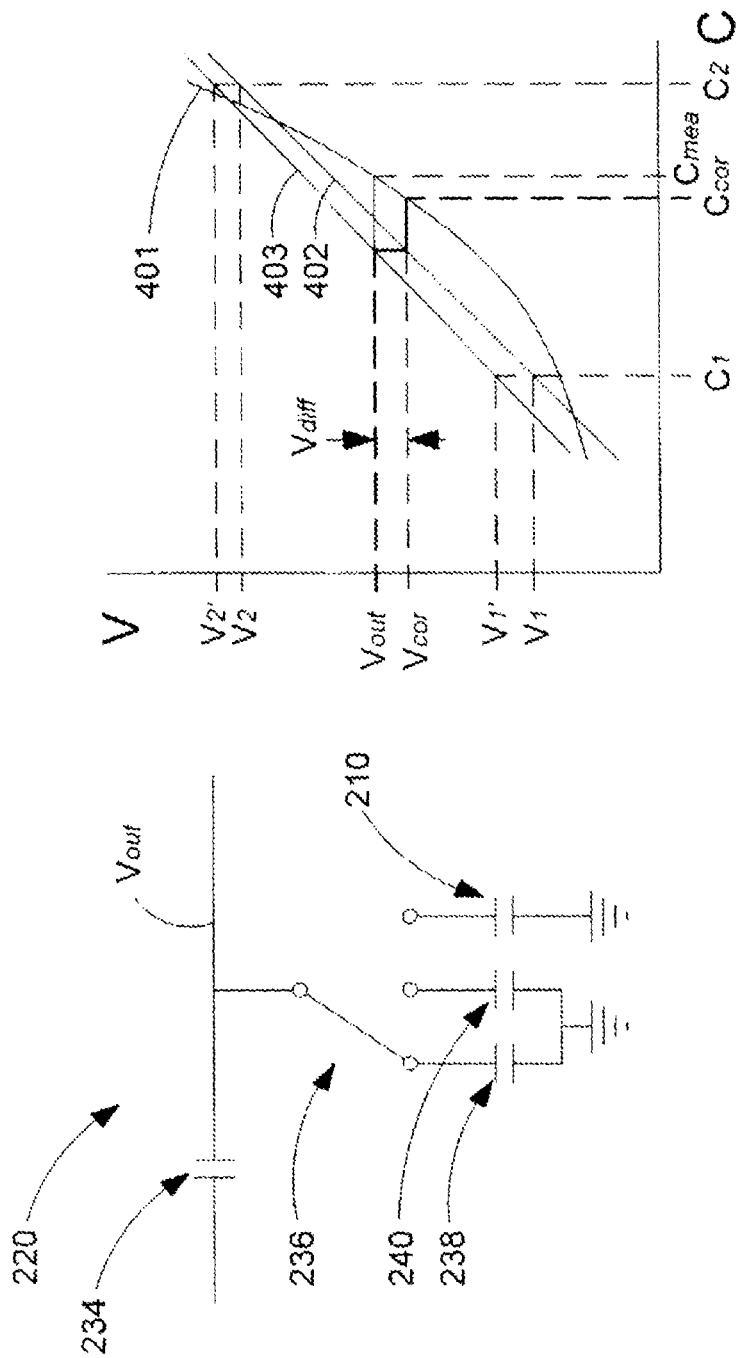

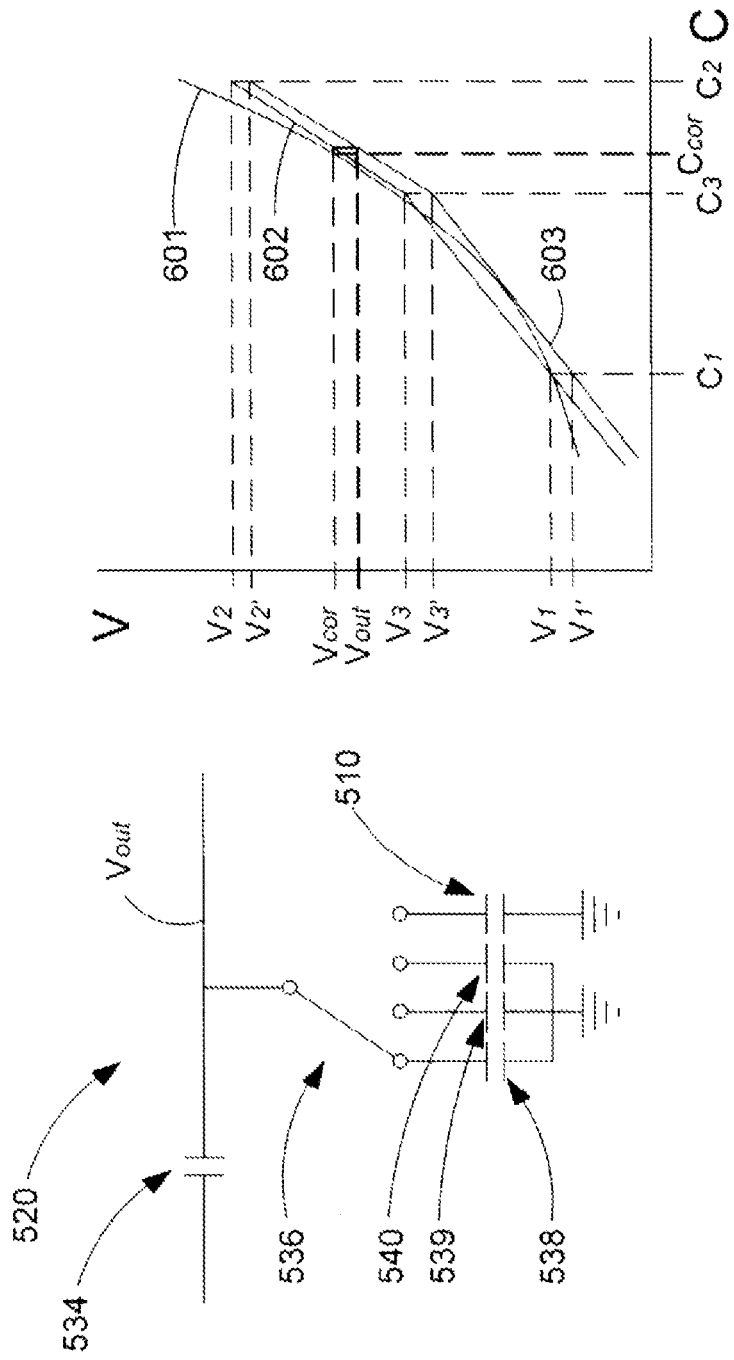

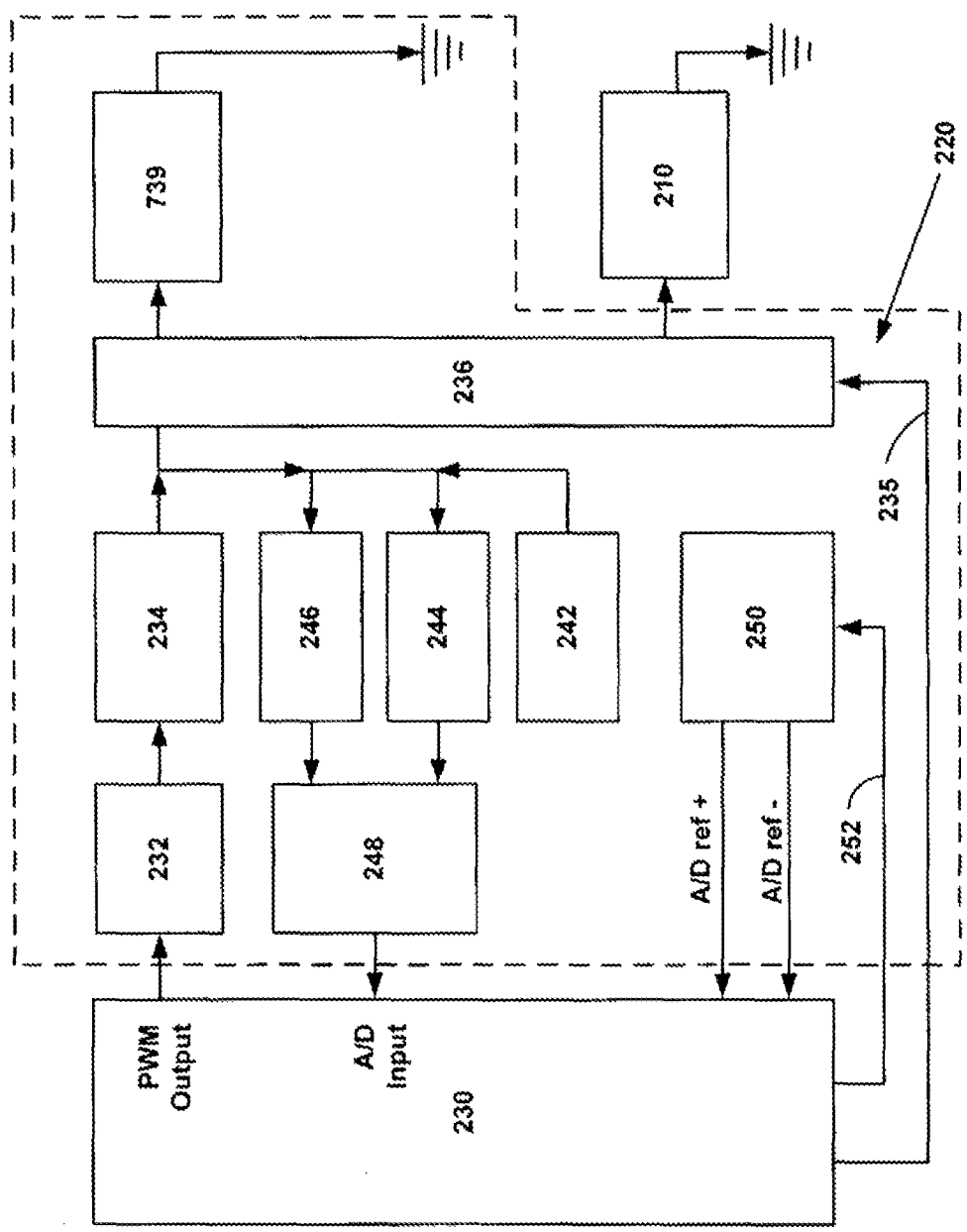

APPARATUS AND METHOD FOR IMPROVING THE ACCURACY OF MEASUREMENTS TAKEN WITH A CAPACITANCE-TYPE SENSOR

CROSS-REFERENCE TO RELATED APPLICATION(S)

This application is a continuation of International Application No. PCT/CA2009/000562, having an international filing date of Apr. 27, 2009, entitled "Apparatus And Method For Improving The Accuracy Of Measurements Taken With A Capacitance-Type Sensor". The '562 international application claimed priority benefits, in turn, from Canadian Patent Application No. 2,629,960 filed Apr. 28, 2008. The '562 international application is hereby incorporated by reference herein in its entirety.

FIELD OF THE INVENTION

The present invention relates to an apparatus and method for improving the accuracy of measurements taken with a capacitance-type sensor. The apparatus and method has proven to be particularly useful for determining liquid level in a storage vessel with a capacitance-type level sensor.

BACKGROUND OF THE INVENTION

Capacitive sensors use the electrical property of "capacitance" to make measurements. Capacitance is a property that exists between any two conductive surfaces within some reasonable proximity. The capacitance is a measure of the amount of charge stored on each plate when a voltage is applied to one of the plates. The amount of charge that can be stored depends upon the distance between the plates, the surface area of the plates, and the permittivity of the non-conducting material between the plates, which is also known as the dielectric. The surface area of the plates is normally constant. Accordingly, with a capacitance-type sensor, if one of the two other factors is held constant, a change in capacitance correlates to a change in the non-constant factor. There are many applications for capacitance-type sensors. For example, if the area of the plates is constant and the dielectric is constant, but the position of the two plates relative to each other is variable, changes in capacitance correlate to changes in the distance between the plates, so a capacitance-type sensor can be used as a proximity sensor or a position sensor. A capacitance-type liquid level sensor typically comprises two conductive surfaces spaced a fixed distance apart from one another and oriented vertically within a storage vessel; when the liquid level changes, the permittivity of the dielectric between the plates changes and this changes the capacitance. That is, with a capacitance-type level sensor the surface area of the plates and the distance between the plates remains constant so that changes in capacitance are proportional to changes in the liquid level. Therefore, the capacitance between the two conductive surfaces of a capacitance-type level sensor increases as the level of the liquid rises and the permittivity of the dielectric changes. The maximum capacitance is measured when the conductive surfaces of the capacitive sensor is completely immersed in liquid.

When a capacitor is charged an electric field develops between the capacitor plates, developing a voltage difference therebetween. For a given capacitor there is a known relationship between charge, capacitance and voltage. The voltage is proportional to the amount of charge and the circuit detects an increase of capacitance when there is an increase in voltage. Because of the correlation between capacitance and voltage, the parameter measured by a capacitance-type sensor can be determined from the voltage measured at the capacitor. In this disclosure, by way of example, the apparatus and method are described in relation to capacitance-type level sensors, but persons skilled in the technology will understand that the same apparatus and method can be applied to other applications with other types of capacitance-type sensors to improve the accuracy of a measured parameter.

Accurately measuring the liquid level of a cryogenic liquid held in a storage vessel is a challenging application for sensors of all types. It is known to use capacitance-type level sensors for measuring cryogenic liquid levels inside a cryogenic storage vessel. However, with cryogenic liquids and storage vessels that are mobile, such as vehicular fuel tanks for storing liquefied natural gas, it can be especially challenging to accurately measure liquid level. Accurately detecting the level of liquid remaining for such applications is important because the consequence of an inaccurate level measurement can result in a vehicle being stranded if it runs out of fuel, or reduced operational efficiency if the vehicle is re-fuelled more frequently than necessary, that is, when a fuel tank is re-filled when there is still ample fuel remaining in the fuel tank. In addition, for vehicles that use a high pressure pump to deliver the fuel to the engine, there can be accelerated wear of the pump components if the pump is operated frequently when the fuel tank is empty.

The desired temperature for storing a liquefied gas depends upon the particular gas. For example, at atmospheric pressure, natural gas can be stored in liquefied form at a temperature of $-160°$ C., and a lighter gas such as hydrogen can be stored at atmospheric pressure in liquefied form at a temperature of $-253°$ C. As with any liquid, the boiling temperature for the liquefied gas can be raised by holding the liquefied gas at a higher pressure. The term "cryogenic temperature" is used herein to describe temperatures less than $-100°$ C., at which a given gas can be stored in liquefied form at pressures less than 2 MPa (about 300 psig). To hold a liquefied gas at cryogenic temperatures, the storage vessel defines a thermally insulated cryogen space. Storage vessels for holding liquefied gases are known and a number of methods and associated apparatuses have been developed for removing liquefied gas from such storage vessels. The terms "cryogenic fluid" and "cryogenic liquid" are used herein to respectively describe a fluid or a liquid that is at a cryogenic temperature.

An additional challenge associated with measuring the level of cryogenic liquids as compared to other liquids, is that cryogenic liquids are typically stored near their boiling temperature, and there may not be as clear a delineation between the liquid and vapor spaces inside the vessel. Known capacitance-type level sensors for measuring cryogenic liquid levels, when operating normally, can be in error by as much as 20 to 25 percent.

Conventional systems need to periodically re-calibrate measurement circuits for capacitance-type sensors to prevent drifts in accuracy but it can be difficult to know when re-calibration is needed because capacitance-type sensors have a capacitance that is variable by nature, depending upon any changes in the parameter that the sensor measures. By way of example, drifts in accuracy can be caused by signal noise, manufacturing tolerances of circuit components that allow some variability in the performance of such components, the effect of temperature on component performance, and the effect of some components degrading in performance over time. Accordingly, for applications where a capacitance-type sensor is employed and the accuracy of the measured parameter is of particular importance, there is a need for more accurate and reliable measurements.

SUMMARY OF THE INVENTION

An apparatus is provided for improving the accuracy of measurements taken from a capacitance-type sensor. The apparatus comprises a capacitance-type sensor for measuring a parameter, a measurement circuit and a microprocessor. The measurement circuit comprises a calibration capacitor with a known and fixed capacitance and a switch for selectively connecting the measurement circuit to one of the capacitance-type sensor or the calibration capacitor. The microprocessor is connected to the measurement circuit to send commands thereto and to receive data therefrom. The microprocessor is programmed to command the position of the switch, determine an error between measured data that is collected by the measurement circuit when it is connected to the calibration capacitor, and predefined data associated with the known capacitance, calculate a correction value based on the error and measured data that is collected by the measurement circuit when it is connected to the capacitance-type sensor, and determine a corrected data measurement by applying the correction value to measured data that is collected by the measurement circuit when it is connected to the capacitance-type sensor.

In preferred embodiments the calibration capacitor is one of at least two calibration capacitors. One calibration capacitor preferably has a fixed capacitance that is closer to a lower end of the capacitance-type sensor's measurable range of capacitance, and a second calibration capacitor has a fixed capacitance that is closer to a higher end of the capacitance-type sensor's measurable range of capacitance. This arrangement with a low side and a high side calibration capacitor is useful when it is desired to improve the accuracy of the sensor measurements across the measurable range of capacitance, since the degree of error in the measured capacitance can be variable across this range.

In a preferred application for the disclosed apparatus, the capacitance-type sensor is a capacitance-type liquid level sensor disposed within a storage vessel and a corrected liquid level measurement is determined from the corrected data measurement. The apparatus is particularly suited for this application when the liquid stored in the storage vessel is a cryogenic liquid and the storage vessel is thermally insulated to reduce boiling and venting of vapor from the storage vessel.

In preferred embodiments of the measuring circuit, the calibration capacitor is mounted with other components of the measurement circuit on a circuit board outside of the storage vessel. An advantage of this arrangement for cryogenic level sensing applications is that the measurement circuit is located outside of the storage vessel where it is accessible for servicing or replacement. This is an advantage over other level sensors that require more instrumentation inside the storage vessel where it is more difficult to service, and where it is exposed to harsh operating conditions.

If the capacitance-type sensor is a liquid level sensor, the storage vessel can be one of a plurality of storage vessels and each storage vessel can have its own capacitance-type level sensor and the measurement circuit is connectable to each capacitance-type level sensor for measuring the capacitance thereof.

In preferred embodiments the measured data is voltage measured by the measurement circuit when the calibration capacitor or the capacitance-type sensor is charged.

As disclosed herein the measurement circuit can comprise other components for improving the resolution and removing noise from the measured data. For example, the measurement circuit can further comprise an analog/digital reference voltage generator that adjusts the analog/digital reference voltage to provide a gain to a measured analog signal.

The microprocessor can be dedicated to the measurement circuit and the corrected data measurement can be sent by the microprocessor to a master electronic control unit that is programmed to use the corrected data measurement to control other devices associated with the apparatus. For example, if the sensor measures liquid level in a storage vessel, and the liquid is fuel for an engine, the electronic control unit can send a signal to a level gauge that displays the liquid level to the engine operator, or if the fuel level is low and the storage vessel is one of a plurality of fuel tanks, the electronic controller can command the fuel supply system to automatically isolate a fuel tank when it is empty and switch to withdrawing fuel from a different fuel tank that is not empty.

Also disclosed is a method for improving the accuracy of measurements taken with a capacitance-type sensor. The method comprises charging the capacitance-type sensor by connecting it to a measurement circuit and collecting measured sensor data correlating to the capacitance of the capacitance-type sensor when the capacitance-type sensor is charged, charging a calibration capacitor, which has a known and fixed capacitance by connecting it to the measurement circuit and collecting measured calibration data correlating to the capacitance of the calibration capacitor when the calibration capacitor is charged, calculating an error between the measured calibration data and predefined calibration data that correlates to the known capacitance of the calibration capacitor, calculating a correction value for the measured sensor data based on the calculated error alone or the calculated error in combination with and the measured sensor data, and, calculating a corrected sensor measurement by applying the correction value to the measured sensor data.

In a preferred method the measured sensor data and the measured calibration data are the respective voltages measured by the measurement circuit when the respective capacitance-type sensor and the calibration capacitor are charged.

The calibration capacitor can be one of a plurality of calibration capacitors, each with a different known and fixed capacitance, and then the method can further comprise, for each sensor measurement, connecting at least two calibration capacitors to the measurement circuit one at a time, measuring the calibration voltage when the respective calibration capacitor is charged and for each of the connected calibration capacitors, calculating a voltage error as the difference between the measured calibration voltage and a predefined calibration voltage correlating to the known capacitance for each calibration capacitor, and extrapolating between measured calibration voltages and predefined calibration voltages to calculate the correction value for the sensor voltage, and then applying the correction value to the sensor voltage to calculate a corrected sensor voltage and the corrected sensor measurement.

When the apparatus comprises a plurality of calibration capacitors it may not be necessary to charge each one of the calibration capacitors each time a sensor measurement is taken. For example if there are four calibration capacitors with respective fixed and known capacitances spaced across the measurable range of capacitance and the measured sensor capacitance is between the capacitances of the two calibration capacitors at the lower end of the measurable range, the method can detect this and take calibration data from only those two calibration capacitors. That is, the method can further comprise charging the capacitance-type sensor before any of the calibration capacitors and then charging, in turn, a predetermined number of calibration capacitors that have respective predefined calibration voltages that are closest to the measured sensor voltage.

When the capacitance-type sensor is a liquid level sensor, as disclosed herein a particularly useful application for the disclosed apparatus is measuring the liquid level with improved accuracy. Accordingly, the method can comprise measuring the liquid level in a storage vessel, an in particular, storage vessels for holding a liquid at cryogenic temperatures. If the storage vessel is one of a plurality of storage vessels and the capacitance-type level sensor is one of a plurality of capacitance-type level sensors, each disposed in a different one of the storage vessels, the method can further comprise charging the calibration capacitor and correcting the measured sensor data when a liquid level measurement is taken from any one of the capacitance-type level sensors.

The method of taking measurements with a capacitance-type sensor comprises calibration steps that comprise charging the calibration capacitor, calculating the error, calculating the correction value and calculating the corrected sensor measurement. In some embodiments the microprocessor can be programmed so that the calibration steps are only done when a predetermined criteria is met. That is, to practice the method, the calibration steps need not be done each time sensor data is measured. For example, the predetermined criteria can be the passing of a predetermined time since the previous time when the calibration steps were done. In another example, the predetermined criteria can be met when the measured sensor data has changed from a previous value by more than a predetermined amount.

BRIEF DESCRIPTION OF THE DRAWINGS

FIG. 3 shows a part of a measurement circuit that comprises two calibration capacitors and a switch for selecting one of the calibration capacitors or the capacitance-type sensor.

FIG. 4 is a graph that shows how the measured capacitance can be plotted and compared to the known calibration capacitances to determine a measurement error and an appropriate correction value.

FIG. 5 shows part of a measurement circuit that comprises three calibration capacitors.

FIG. 6 is a graph that shows how the measured capacitance from three calibration capacitors can be used if more precise measurements are needed.

FIG. 7 shows data collection and processing steps for a system that comprises a capacitance-type sensor and only one calibration capacitor.

In the different embodiments shown in the Figures, like numbers increased by increments of one hundred show similar components that function in a similar way in different embodiments.

DETAILED DESCRIPTION OF PREFERRED EMBODIMENT(S)

Figure 1:
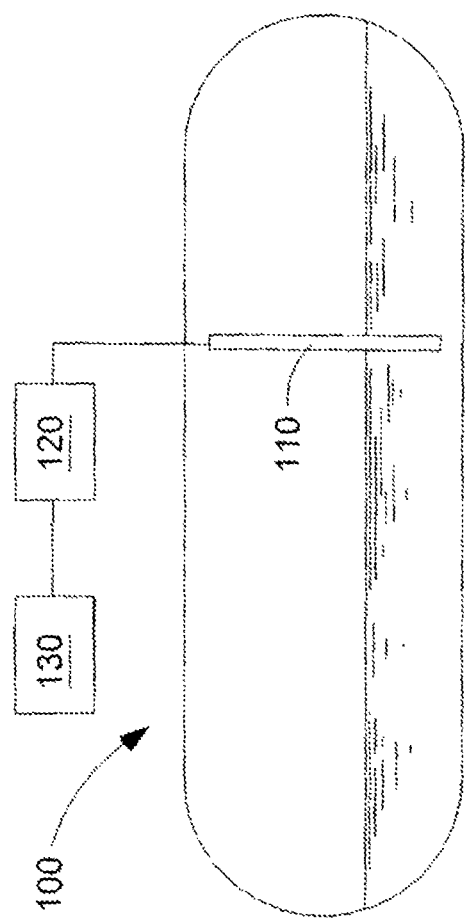
FIG. 1 shows a schematic view of a storage vessel with a capacitance-type level sensor, a measurement circuit, and a microprocessor.

FIG. 1, shows by way of example, a schematic view of an apparatus that comprises storage vessel 100, level sensor capacitor 110, measurement circuit 120 and microprocessor 130. As will be described below with reference to illustrative examples of preferred embodiments, microprocessor 130 calculates a corrected liquid level measurement from the actual measurements collected from level sensor capacitor 110 and at least one calibration capacitor. Level sensor capacitor 110 is a capacitance-type level sensor that is oriented within storage vessel 100 to measure liquid level therein. Liquid level sensors of this type can be employed in storage vessels for many types of liquids. Without limiting the disclosed apparatus and method, a particularly useful application of the disclosed apparatus and method is measuring the liquid level in a storage vessel that is designed to store liquefied gases at cryogenic temperatures, and the illustrative examples set out herein relate to this application. It can be challenging to use other types of level sensors in storage vessels for cryogenic liquids because of the extremely low temperatures, the need to thermally insulate the storage volume, and the need to reduce heat leak into the storage volume. It can be difficult to access, service or replace a level sensor that is installed in a sealed and insulated storage vessel and capacitance-type sensors are relatively simple and robust. Other challenges associated with measuring the liquid level in a cryogenic storage vessel have already been discussed herein, and despite all of these challenges compared to other available level sensors, capacitance-type level sensors remain a suitable choice for this application. However, as already noted, one of the disadvantages of capacitance-type sensors is their accuracy. Sometimes it can be difficult to know when a change in the measured capacitance is because of a drift in accuracy or because the liquid level has changed. The disclosed apparatus and method have been found to improve the accuracy of level sensing measurements by using a measurement circuit that comprises at least one calibration capacitor, which has a capacitance that is fixed and known. The microprocessor is programmed to calculate a correction value that is used to correct the measured level sensor capacitance based on the difference between the known capacitance and the measured capacitance of one or more calibration capacitors.

The capacitance of level sensor capacitor 110 can be determined from the voltage at level sensor capacitor 110, measured by measurement circuit 120 when measurement circuit 120 and level sensor capacitor 110 are connected to each other and a measuring signal generated by microprocessor 130 is sent to charge level sensor capacitor 110 via measurement circuit 120. Because the measurement circuit itself can introduce errors between the actual capacitance and the measured capacitance, to improve the accuracy of the liquid level measurement, the disclosed apparatus and method is employed to correct such errors so that the measured capacitance more accurately reflects the actual capacitance. With the method disclosed herein, at least one, and preferably a plurality of calibration capacitors with known capacitances are part of the measurement circuit and are connectable one at a time to the measurement signal by operation of a switch. When a calibration capacitor is charged, errors in the measured capacitance are detected by calculating the difference between the known capacitance of the calibration capacitor and the measured capacitance. Because of the known relationship between the calibration voltage and the calibration capacitance, the calculated error is the difference between the measured voltage and the calibration voltage that is normally associated with the known calibration capacitance. If more than one calibration capacitor is employed to calculate the error at two calibration points, a linear extrapolation between the two calibration points can be used to calculate a correction value that is an estimation of the error at the measured voltage when the measurement circuit is connected to level sensor capacitor 110. Accordingly, the accuracy of the liquid level measurement can be improved by applying the correction value to the measured voltage to determine a corrected voltage, and from that microprocessor 130 can be programmed to calculate a corrected capacitance and a corrected liquid level measurement. Because the amount of error can vary depending upon the value of the measured voltage, using more than one calibration capacitor, each with a different known and fixed capacitance, improves the accuracy of the corrected capacitor sensor measurements across the measurement range. In a preferred apparatus the measurement circuit comprises a plurality of calibration capacitors and in a preferred method measurements are taken from a plurality of calibration capacitors to better estimate the error and the appropriate correction value to be applied to the sensor measurements. The two illustrative examples described in more detail with reference to FIGS. 2-6 each comprise a measurement circuit that comprises a plurality of calibration capacitors.

The accuracy of liquid level measurements can depend upon the operating conditions but with the disclosed apparatus and method, for a storage vessel holding liquefied natural gas, using two calibration capacitors, it has been possible to improve accuracy of the liquid level measurements by reducing the error in such measurements to about 1%.

Figure 2:
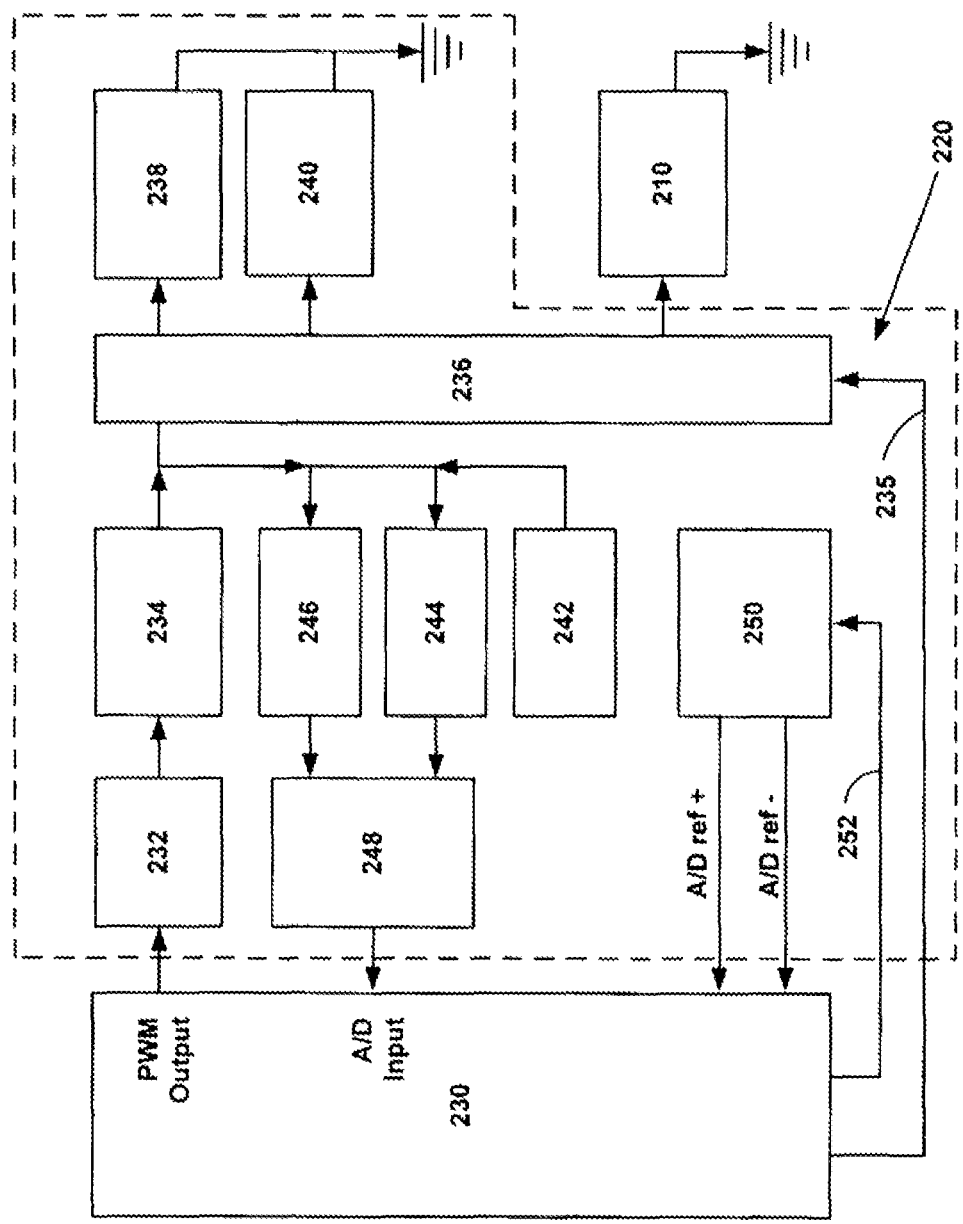
FIG. 2 shows data collection and processing steps for a system that comprises a capacitance-type sensor, a measurement circuit and a microprocessor for collecting measurement data from the sensor with improved accuracy.

By way of example, measurement circuit 120 is explained in more detail with reference to a first preferred embodiment described with reference to FIGS. 2-4. FIG. 2 shows the data collection and processing steps for the level sensing system that are performed by the apparatus shown in FIG. 1. FIG. 3 shows the portion of the measurement circuit that collects the data from the calibration capacitors and the level sensor capacitor. FIG. 4 shows a plot of voltage versus capacitance which shows how the calibration measurements can be used to determine an error and calculate a correction value that is applied to the measurements from the level sensor capacitor to calculate a corrected liquid level measurement.

With reference now to FIG. 2, microprocessor 230 is programmed to output a measuring signal. The measuring signal can be generated by a pulse width modulator (PWM) to produce a measuring signal in the shape of a predetermined waveform. For example, a square shaped waveform with a 50% duty cycle has been found to be effective with the disclosed method. The measuring signal produced by microprocessor 230 is sent to measurement circuit 220 shown in FIG. 2 within the dashed lines. In step 232 a PWM driver boosts the power of the measuring signal to provide the measuring signal with the needed load driving capability. In step 234 a slope control capacitor adjusts the slope of a plot of the voltage measured at the capacitor against capacitance (measured in farads). Slope is adjusted to select a voltage range that spans a corresponding voltage range that is associated with the measurable range of capacitance at level sensor capacitor 210 as well as the capacitance of low side calibration capacitor and high side calibration capacitor, these calibration capacitances typically already being within the measurable range of capacitance from level sensor capacitor 210. The selected voltage range is preferably near an optimal voltage range for best signal resolution, since there is normally a voltage range where signal resolution is maximized. In the tested prototypes the slope control capacitor was used to broaden the voltage range, but if the voltage range was increased too far beyond the optimal voltage range, the signal resolution decreased. That is, there is a limit to how much the voltage range should be increased. Because it can be difficult to select a voltage range that always maximizes the signal resolution for all capacitance measurements, the disclosed method teaches selecting a voltage range that is at or near the voltage range that delivers the maximum signal resolution.

As indicated by signal line 235, microprocessor 230 commands switch 236 to selectively connect measurement circuit 220 to one of the shown capacitors. While the capacitance of level sensor capacitor 210 is variable with changes in the liquid level inside the storage vessel, the calibration capacitors have a fixed and known capacitance and they are not disposed within the storage vessel. In preferred embodiments the calibration capacitors are on a circuit board with the other components of the measurement circuit. It is important that the same measurement circuit is used to measure the capacitance of both level sensor capacitor 210 and the calibration capacitors because this allows the errors introduced by the measurement circuit to be compensated for, in effect re-calibrating the liquid level measurements whenever measurements from the calibration capacitor(s) are taken and used to correct the liquid level measurements. As discussed previously, errors can be introduced into the data measured by the measurement circuit, for example, because of component degradation over time, measurement signal noise, and other influences such as changes in temperature. Accordingly, switch 236 is an important component of measurement circuit 220 because it allows the same components of measurement circuit 220 to collect data from both level sensor capacitor 210 and the calibration capacitors. In preferred embodiments there are at least two calibration capacitors, which are shown in the illustrated embodiment shown in FIGS. 2-4. With reference still to FIG. 2, high side calibration capacitor 238 preferably has a fixed capacitance near the upper end of the capacitance range measurable by level sensor capacitor 210, corresponding to a condition when the storage vessel is full or close to being full, and low side calibration capacitor 240 preferably has a fixed capacitance near the lower end of the capacitance range measurable by level sensor capacitor 210, corresponding to when the liquid level is near the bottom of the storage vessel and the storage vessel is close to being empty. More calibration capacitors can be employed as will be explained in more detail with reference to the embodiment shown in FIGS. 5 and 6. The measurements taken by measurement circuit 220 when it is connected to the calibration capacitors are used to calculate a correction value that can be used to calibrate measurements taken from level sensor capacitor 210, which is mounted within the storage vessel in a known manner.

To take a liquid level measurement, switch 236 connects measurement circuit 220 in turn to each one of capacitors 210, 238 and 240, one at a time. When measurement circuit 220 is connected to one of the capacitors, the measuring signal is sent to the connected capacitor and the voltage out is measured from the charged capacitor. The same measuring steps are repeated for each one of calibration capacitors 238 and 240, and level sensing capacitor 210. In step 242 a direct current offset, commonly known as a DC bias is applied to the voltage out signal so that the center point of the voltage out signal is shifted a predetermined voltage. In step 244 a minimum voltage capture circuit captures the minimum voltage of the measurement signal ("Vm_min"), and in step 246 a maximum voltage capture circuit captures the maximum voltage of the measurement signal ("Vm_max"). In step 248 a differential amplifier is employed to calculate the difference between the maximum voltage of the measurement signal and the minimum voltage of the measurement signal, and then the calculated difference is multiplied by the gain. The gain can be a fixed value associated with the differential amplifier. The output from the differential amplifier is a measured voltage result ("Vm_result"), shown in FIG. 2 as the Analog/Digital ("A/D") Input. That is, expressed as an equation, Vm_result=G×(Vm_max−Vm_min), where G is the gain of the differential amplifier.

In preferred embodiments, via signal line 252, microprocessor 230 sets up the maximum and minimum values for Vm_result to A/D reference voltage generator 250, which sets values for the A/D reference voltage+ (shown as "A/D ref+" in FIG. 2), and the A/D reference voltage− (shown as "A/D ref−" in FIG. 2). The microprocessor uses the variable A/D ref+ and the A/D ref− to increase the signal resolution and the measurement accuracy. For example, if the A/D reference voltage is fixed at 5 volts, the A/D resolution is 10 bits, and the measurement range is 1 Volt, resolution of the measured A/D signal=(A/D ref+−A/D ref−)/2^10=5000 mV/1024 bits=4.88 mV/bit. The "Accuracy"=Resolution of A/D/(Vm_result_max−Vm_result_min)=4.88/1000=0.488%. If the A/D reference voltage is variable based on the range of measurement result, the improved resolution of the A/D signal=(A/D ref+−A/D ref−)/2^10=1000 mV/1024 bits=0.98 mV/bit and the Accuracy=Resolution of A/D/(Vm_result_max−Vm_result_min)=0.98/1000=0.098%.

While the method steps set out with reference to FIG. 2 are described by way of example in relation to the apparatus set out in FIG. 1, persons skilled in the technology will readily understand that level sensor capacitor 210 could be replaced with many different types of capacitance-type sensors and the same method steps can be applied to improve the accuracy of measurements collected from the capacitance-type sensor that is connected to the measurement circuit 220. That is, the disclosed method and apparatus can be used to improve the accuracy of measurements taken from any capacitance-type sensor, such as a proximity or location sensor, and the disclosed liquid level capacitance-type sensor is used herein as an illustrative example without limiting the types of applications that can benefit from the disclosed measurement circuit and method.

Returning now to the illustrative example, for the level sensor capacitor and each one of the calibration capacitors, when the measurement signal is sent to it and the connected capacitor is charged, measurement circuit 220 measures the voltage at the charged capacitor. FIG. 3 is a circuit drawing that shows a part of measurement circuit 220 that relates to the collection of the "voltage out" measurements from the charged calibration and level sensor capacitors. The embodiment shown in FIG. 3 shows slope control capacitor 234, which has the same function described with reference FIG. 2. Switch 236 is an analog switch that connects measurement circuit 220 to one of the calibration or level sensor capacitors. Like in the method steps of FIG. 2, there is high side calibration capacitor 238, low side calibration capacitor 240 and level sensor capacitor 210. Level sensor capacitor 210 is disposed inside the storage vessel, where it is immersible in the liquid stored therein, while the calibration sensors are not in contact with the liquid and are preferably disposed outside of the storage vessel. When switch 236 connects the circuit to each of the capacitors, by measuring the voltage out for each capacitor when it is charged, as will be described with reference to FIG. 4, the measured voltages can be used to detect an error and calculate a correction value from the calibration capacitor measurements that can be applied to the level sensor capacitor measurement to determine a corrected capacitance and/or a corrected liquid level measurement. The data that defines the predetermined relationships between the voltage and the capacitance of the calibration and level sensor capacitors can be stored in a reference table that can be accessed by the microprocessor.

FIG. 4 is a graph that illustrates the disclosed method for a circuit that has two calibration capacitors like the embodiment shown in FIGS. 2 and 3. The graph plots voltage out versus capacitance. This plot is not to scale and some features have been exaggerated to better illustrate the disclosed method. Voltage out V1 is the baseline calibration voltage out that is expected when measurement circuit 220 is connected to low side calibration capacitor 240 and C1 is the known capacitance thereof. V1' is the voltage out that is actually measured when switch 236 connects low side calibration capacitor 240 to measurement circuit 220. Voltage out V2 is the baseline calibration voltage out that is expected when measurement circuit 220 is connected to high side calibration capacitor 238, and C2 is the known capacitance thereof. V2' is the voltage out that is actually measured when switch 236 connects high side calibration capacitor 238 to measurement circuit 220.

Curve 401 is a plot of the characteristic baseline relationship between voltage out and capacitance for level sensor capacitor 210. Line 402 is a linear plot through the intersections of V1 and C1, and V2 and C2, while line 403 is a linear plot through the intersections of V1' and C1, and V2' and C2. The voltage difference between line 402 and 403 is the estimated correction value to be applied to the measured voltage to correct the measured voltage Vout to calculate Vcor that is used to calculate Ccor, which is the corrected value for the level sensor capacitance. That is, if Vout is not corrected, in the illustrated example, based upon predefined curve 401, the capacitance determined from measured voltage out Vout would be Cmea, which correlates to a higher liquid level than the actual liquid level which correlates more accurately to the liquid level associated with Ccor, which is determined from Vcor, which is calculated by subtracting Vdiff from Vout.

In a preferred method for the embodiment shown in FIGS. 2-4, by operating switch 236, three voltage measurements are taken each time the liquid level is measured. Plotted line 402 is predefined. Voltage out Vout is measured when measurement circuit 220 is connected to level sensor capacitor 210, but before this voltage is used to determine the level sensor capacitance and the liquid level, it is corrected by adding or subtracting Vdiff. Vdiff is the voltage difference between line 402 and 403 where Vout intersects with line 403. Line 403 can be calculated from the measurements of V1' and V2' when the measurement circuit is connected to low side calibration capacitor 240 and high side calibration capacitor 238, respectively. In the example shown in FIG. 4, for a given capacitance, the corresponding measured voltage associated with line 403 is higher than the corresponding calibration voltage associated with line 402. This means that to correct the measured voltage out associated with the level sensor capacitor, Vdiff must be subtracted from Vout to calculate Vcor. If, unlike the illustrated example, line 403 happened to be below line 402 at Vout, then the voltage difference between the lines 402 and 403 would be added to Vout to calculate Vcor. Since curve 401 defines the relationship between voltage and capacitance for level sensor capacitor 210, based on this predefined relationship, which can be stored in a table accessible by the microprocessor, from the calculated value for Vcor or Ccor the liquid level can be more accurately determined. In FIG. 4 the slightly bolder dashed line that has one end extending horizontally from Vout graphically demonstrates how Ccor is calculated using the disclosed method. The bolder dashed line steps down to Vcor from Vout, based on the calculated Vdiff, which is the difference between line 403 and 402 at the point where Vout intersects line 403, and using the intersection between Vcor and line 401 to determine the corrected capacitance Ccor instead of Cmea.

In embodiments like the preferred one shown in FIGS. 2-4, with only two calibration capacitors a linear approximation is used to calculate a capacitance correction value based upon the difference between baseline calibration plot 402 and measured values associated with plot 403. This apparatus and method have been found to adequately improve the accuracy of the liquid level sensor measurements, but in other embodiments, more than two calibration capacitors can be employed if there are more significant variations between the measured voltages and the calibration voltages across the measurement range. Generally, the use of more calibration capacitors improves the accuracy of corrected liquid level sensor measurements and the accuracy is greatest when the measured level sensor capacitance is at or near one of the known calibration capacitances.

To illustrate an example where more than two calibration sensors are employed, FIG. 5 shows an embodiment wherein three calibration capacitors are employed, namely low side calibration capacitor 540, high side calibration capacitor 538 and intermediate calibration capacitor 539, which has a known and fixed capacitance between that of the other two calibration capacitors. Slope control capacitor 534, analog switch 536 and level sensor capacitor 510 function in the substantially the same way as the like-numbered components shown in FIG. 3. FIG. 6 is a plot of voltage versus capacitance for an embodiment that employs the measurement and calibration circuit shown in FIG. 5. V3 is the baseline calibration voltage out that corresponds to known capacitance C3. As shown in this example, the values for V1', V2' and V3' are all lower than the corresponding values for V1, V2 and V3. This means that the measured voltages are lower than the baseline calibration so when applying the disclosed method in this example, the voltage difference between line 402 and 403 at the point where Vout intersects line 403 is added to Vout to calculate Vcor, which can then be used to calculate Ccor and liquid level based upon the predefined relationship characterized by plot 601 and the known relationship between level sensor capacitance and liquid level. In FIG. 6, like in FIG. 4, the slightly bolder dashed line that extends horizontally from Vout demonstrates graphically how Ccor is determined from Vout. That is, in this example, Vout is stepped up to Vcor because line 603 is below line 602 and the size of the step is the difference between lines 603 and 602 where Vout intersects line 603. Ccor is determined from the point where Vcor intersects line 601, and the corrected liquid level can be determined from Vcor or Ccor because of the known relationship between voltage, capacitance, liquid level.

When a measurement circuit has a plurality of calibration capacitors, to reduce the number of measurements that are taken to calculate the corrected liquid level, the microprocessor can be programmed to connect the liquid level sensor capacitor first, and then the microprocessor can be programmed to operate the switch to connect and take voltage out measurements from only the calibration capacitors with a known capacitance within a predetermined range of the measured level sensor capacitance. Accordingly, if a measurement circuit comprises several calibration capacitors, this technique can reduce the number of calibration measurements that are taken and the computational effort and time required of the microprocessor whenever a liquid level measurement is taken.

Other strategies can also be combined with the disclosed method. For example, the microprocessor can be programmed so that it does not re-calibrate the measurement circuit with each sensor data measurement, but only periodically on a timed basis, or only when the measured sensor data has changed from the previous measurement by more than a predetermined amount. Different strategies can be combined with each other, for example, the microprocessor can be programmed to take measurements from the calibration capacitors and correct the measured sensor data at the earlier instance of: (a) detecting a change in the measured sensor data from the previously measured sensor data that is greater than 0.5%; or (b) the passing of a predetermined amount of time since the last time measurements were taken from the calibration capacitors.

As shown by the illustrative examples, in the preferred embodiments a plurality of calibration capacitors are used because the error in the measured voltage can be different depending upon the value of the measured voltage, and by using at least two calibration capacitors, the measurement error can be better approximated across the voltage measurement range. However, not all applications require the same degree of accuracy across the entire measurement range and the number of calibration capacitors can be chosen to match the needs of the application. For example, for some applications the method can employ a single calibration capacitor to calculate the measured voltage error at a single point and then the correction value determined from this point can be applied to the voltage out measured when the measurement circuit is connected to the level sensor capacitor. Compared to embodiments that use more than one calibration capacitor, depending upon the sensor and the application, a circuit with only one calibration capacitor can be increasingly less accurate as the difference increases between the measured level sensor capacitance and the calibration capacitance, especially if the error is known to change across the measurement range. In addition, a circuit with only one calibration capacitor is less robust than circuits with a plurality of calibration capacitors should there be a problem with the one calibration capacitor. Nevertheless, for an application that only requires accurate level measurements near one point, for example, to determine when a storage vessel is empty, or near empty, the disclosed method can be employed with only one calibration capacitor, such as only a "low side" calibration capacitor that has a fixed and known capacitance near the low end of the range of measurable level sensor capacitance values. For other applications it may be more important to accurately detect when the liquid level is high to control other systems, for example to prevent overfilling the storage vessel or to prevent wasting liquid that otherwise by-passes or overflows from the storage vessel. In such an application it can be acceptable to use only one calibration capacitor, for example, only a "high side" calibration capacitor that has a fixed and known capacitance near the high end of the range of measurable level sensor capacitance values. FIG. 7 shows by way of example the data collection and processing steps for an embodiment that uses only one calibration capacitor, 739, which could be a low side calibration capacitor like 240 in FIG. 2, or a high side calibration capacitor like 238 in FIG. 2, depending upon the needs of the application. The rest of the reference numbers in FIG. 7 that are the same as the reference numbers in FIG. 2 refer to like steps and components.

In yet another embodiment, where the application is concerned mostly with determining when the storage vessel is empty and warning when the storage vessel is nearly empty, a plurality of calibration sensors can be employed, but instead of using a high side calibration capacitor, two or more calibration capacitors can be used, each with different fixed and known capacitances, with these capacitances all being closer to the low end of the measurable range of capacitance than to the high end of this range. This can deliver more accuracy than a single low side calibration capacitor and improved robustness should one of the calibration capacitors fail.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method for improving the accuracy of measurements taken with a capacitance-type sensor, the method comprising:
charging the capacitance-type sensor by connecting it to a measurement circuit and collecting measured sensor data correlating to the capacitance of the capacitance-type sensor when the capacitance-type sensor is charged;
charging a calibration capacitor, which has a known and fixed capacitance by connecting it to the measurement circuit and collecting measured calibration data correlating to the capacitance of the calibration capacitor when the calibration capacitor is charged;
calculating an error between the measured calibration data and predefined calibration data that correlates to the known capacitance of the calibration capacitor;
calculating a correction value for the measured sensor data based on the calculated error alone or the calculated error in combination with the measured sensor data; and
calculating a corrected sensor measurement by applying the correction value to the measured sensor data;
wherein the calibration capacitor is one of a plurality of calibration capacitors, each with a different known and fixed capacitance, and the method further comprises for each sensor measurement, connecting at least two calibration capacitors to the measurement circuit one at a time, measuring the calibration voltage when the respective calibration capacitor is charged and for each of the connected calibration capacitors, calculating a voltage error as the difference between the measured calibration voltage and a predefined calibration voltage correlating to the known capacitance for each calibration capacitor, and extrapolating between measured calibration voltages and predefined calibration voltages to calculate the correction value for the sensor voltage, and then applying the correction value to the sensor voltage to calculate a corrected sensor voltage and the corrected sensor measurement.

2. The method of claim 1 wherein the measured sensor data and the measured calibration data are the respective voltages measured by the measurement circuit when the respective capacitance-type sensor and the calibration capacitor are charged.

3. The method of claim 1 wherein each time a sensor measurement is taken the method further comprises charging the capacitance-type sensor before any of the calibration capacitors and then charging, in turn, a predetermined number of calibration capacitors that have respective predefined calibration voltages that are closest to the measured sensor voltage.

4. The method of claim 1 wherein the capacitance-type sensor is a liquid level sensor and the method further comprises measuring the liquid level in a storage vessel for holding a liquid at cryogenic temperatures.

5. The method of claim 4 wherein the storage vessel is one of a plurality of storage vessels and the capacitance-type level sensor is one of a plurality of capacitance-type level sensors, each disposed in a different one of the storage vessels, and the method further comprises charging the calibration capacitor and correcting the measured sensor data when a liquid level measurement is taken.

6. The method of claim 1 wherein calibration steps comprising charging the calibration capacitor, calculating the error, calculating the correction value and calculating the corrected sensor measurement, are only done when a predetermined criteria is met.

7. The method of claim 6 wherein the predetermined criteria is the passing of a predetermined time since the previous time when the calibration steps were done.

8. The method of claim 6 wherein the predetermined criteria is met when the measured sensor data has changed from a previous value by more than a predetermined amount.

* * * * *